(12) United States Patent
Braeuchle et al.

(10) Patent No.: US 7,227,454 B2
(45) Date of Patent: Jun. 5, 2007

(54) DISPLAY DEVICE FOR AN ASSISTANCE OR SUPPORT SYSTEM FOR TRANSPORT MEANS

(75) Inventors: Goetz Braeuchle, Reichartshausen (DE); Martin Heinebrodt, Stuttgart (DE); Juergen Boecker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 10/481,918

(22) PCT Filed: Jun. 27, 2002

(86) PCT No.: PCT/DE02/02329

§ 371 (c)(1),
(2), (4) Date: Jun. 3, 2004

(87) PCT Pub. No.: WO03/004299

PCT Pub. Date: Jan. 16, 2003

(65) Prior Publication Data

US 2004/0212483 A1    Oct. 28, 2004

(30) Foreign Application Priority Data

Jun. 29, 2001    (DE) .............................. 101 31 478

(51) Int. Cl.
*B60Q 1/00* (2006.01)
(52) U.S. Cl. ............... 340/435; 340/436; 340/437; 340/438; 701/72; 701/116; 701/210
(58) Field of Classification Search ........ 340/435, 340/436, 437, 438, 461; 701/72, 116, 210
See application file for complete search history.

(56) References Cited

U.S. PATENT DOCUMENTS

| | | | |
|---|---|---|---|
| 4,890,088 A | * | 12/1989 | Woodell ............... 340/459 |
| 5,519,536 A | * | 5/1996 | Hoehn ............... 359/630 |
| 5,982,278 A | * | 11/1999 | Cuvelier ............... 340/436 |

(Continued)

FOREIGN PATENT DOCUMENTS

DE        195 39 799        5/1996

(Continued)

OTHER PUBLICATIONS

Displaying Adaptive Cruise Control and Forward Collision Warning Information to an Automobile Driver by way of a Head-Up Display; Research Disclosure, Kenneth Mason Publications, Hampshire, GB; pp. 491-492; Jan. 8, 1997.

(Continued)

*Primary Examiner*—Jeffery Hofsass
*Assistant Examiner*—Samuel J Walk
(74) *Attorney, Agent, or Firm*—Kenyon & Kenyon LLP

(57) ABSTRACT

To provide a device associated with at least one means of transport, in particular at least one motor vehicle, for the detection, in particular intuitive detection, of the operating and/or system states of at least one assistance/support system for the lateral guidance of the means of transport, in which the acceptance of the assistance/support system is increased, for example in such a way that the response of the system may be readily assessed at any time by the driver of the means of transport, at least one display element is provided for displaying the particular operating and/or system state.

10 Claims, 1 Drawing Sheet

U.S. PATENT DOCUMENTS

| | | | | |
|---|---|---|---|---|
| 6,055,467 A | * | 4/2000 | Mehring et al. | 701/23 |
| 6,057,754 A | * | 5/2000 | Kinoshita et al. | 340/435 |
| 6,370,474 B1 | * | 4/2002 | Hiwatashi et al. | 701/300 |

FOREIGN PATENT DOCUMENTS

| | | |
|---|---|---|
| DE | 195 07 956 | 9/1996 |
| DE | 195 07 957 | 9/1996 |
| DE | 196 22 752 | 5/1997 |
| DE | 196 32 929 | 11/1997 |
| DE | 196 27 923 | 1/1998 |
| DE | 196 45 631 | 5/1998 |
| DE | 198 41 706 | 3/1999 |
| DE | 198 21 163 | 11/1999 |
| DE | 198 47 611 | 4/2000 |
| DE | 199 33 504 | 1/2001 |
| DE | 199 50 155 | 5/2001 |
| EP | 0 640 903 | 3/1995 |
| FR | 2 618 244 | 1/1989 |
| JP | 11126300 A * | 5/1999 |
| JP | 411126300 A * | 5/1999 |
| WO | WO 00/14697 | 3/2000 |

OTHER PUBLICATIONS

Displaying Adaptive Cruise Control and Forward Collision Waring Information in an Automobile Driver by Way of a Head-Up Display, Aug. 1997, 491-492, Research Disclosure.

* cited by examiner

DISPLAY DEVICE FOR AN ASSISTANCE OR SUPPORT SYSTEM FOR TRANSPORT MEANS

BACKGROUND INFORMATION

In modern means of transport, such as motor vehicles, for example, it is becoming increasingly common to provide systems which support the driver of the means of transport in driving same, or which simplify specific driving maneuvers for the driver; such systems may be subsumed under the general term advanced driver assistance systems (ADAS).

One class of ADAS currently under development is systems concerning the lateral guidance of the means of transport. The functional scope of such systems includes lane departure warning (LDW), lane keeping support (LKS), and automatic lateral guidance. However, such systems must be intuitively understandable and operable by the driver of the means of transport so that the driver is effectively relieved of his driving task.

Based on the above-referenced disadvantages and shortcomings, an object of the present invention is to increase the acceptance of the aforementioned assistance/support systems for means of transport, for example in such a way that the response of such systems may be readily assessed at any time by the driver of the means of transport.

SUMMARY OF THE INVENTION

The object is achieved according to the teachings of the present invention by a device associated with at least one means of transport, in particular at least one motor vehicle, for the detection, in particular intuitive detection, of the operating and/or system states of at least one assistance/support system for the lateral guidance of the means of transport.

Consequently, an essence of the present invention is shown in the definition of operating/system states to be displayed, as well as in a design for visually representing these operating/system states, thus providing a visual and intuitively detectable representation of the particular operating/system states to the driver of the means of transport; the driver of the means of transport also receives helpful and rapid support while learning the system response.

To this end, one or more display elements (for example, one to three display elements for the individual system states) are provided which are capable of displaying the following system states for the lateral guidance support:
  switched off;
  switched on, passive (no assistance function active);
  switched on, actively warning (only LDW active);
  switched on, actively regulating (only LKS active); and
  switched on, actively warning and actively regulating (both LDW and LKS active).

It should be noted that for assistance/support systems without steering actuators, the latter two system states are omitted.

It is advantageously provided that
  the actively warning state may be displayed by at least one lane departure warning (LDW);
  the actively regulating state may be displayed by at least one lane keeping support (LKS); and
  the actively warning and actively regulating state may be displayed by at least one lane departure warning and by at least one lane keeping support.

According to one preferred embodiment of the present invention, in the switched-on state it is possible to continuously display whether the assistance/support system has detected a left boundary (or a left roadway marking) and/or a right boundary (or a right roadway marking); in other words, for informing the driver of the means of transport, a display of recognized boundaries or markings is possible even in the passive state in the method according to the present invention.

Thanks to this advantageous technical measure, which suitably may also include a separation by main symbol and roadway boundary, the driver of the means of transport is supported in such a way that information is provided as quickly as possible regarding the possibilities and the limits of the assistance/support system, which in turn improves traffic safety.

To refine the present invention, in particular in a particularly inventive manner, a total of up to five display elements may be provided which have the following meanings or functions:
(a) assistance/support system is switched on;
(b) left marking (or left roadway boundary) is detected;
(c) right marking (or right roadway boundary) is detected;
(d) lane departure warning (LDW) is active; and
(e) lane keeping support (LKS) is active.

The above-defined system states for the lateral guidance support are preferably displayed essentially by display elements (a), (d), and (e); two or all three of these display elements (a), (d), and (e) may also be represented by a single display element, it also being possible in the manner according to the present invention for the different system states for the lateral guidance support to be implemented or coded by changing colors.

However, if display elements (a), (d), and (e) are to be implemented separately in an advantageous manner, the "degree of freedom" and additional information such as an error message, warning message, or the like, must be signaled for each of these display elements by blinking of the symbol or by a coloration that differs from the default or normal stated (e.g., red instead of green).

In another advantageous embodiment of the present invention, display elements (b) and (c) may be used to continuously display the state of the roadway boundary when the assistance/support system is switched on.

In this regard it should be noted that under certain circumstances, such as when relatively little space is available on the instrument panel, display elements (b) and (c) may be combined using at least one AND logic operation or at least one OR logic operation.

The above-described display elements may be advantageously implemented by backlit pictograms; alternatively or in addition, the display elements may be embodied with greater flexibility by at least one matrix of preferably multicolored, actively lighting subelements, for example by at least one color display screen or at least one light emitting diode (LED) matrix.

French Patent Application No. FR 2 618 244 describes a unit for observing and recording the driving behavior of a person, in particular a student driver, for the visualization, support, and monitoring by third parties such as a tester. Also in the cited document, directions, for example a switching request, are automatically generated, and the surroundings to the left and right as well as the distance to the vehicle in front are recorded.

However, in contrast to FR 2 618 244, according to the present invention the inputs from a support system, not the inputs from the driver of the means of transport, are visualized. In addition, the display device according to the present invention does not indicate to what extent the steering angle should be corrected; moreover, in the present invention information about the particular operating/system state of the assistance/support system is communicated to the driver of the means of transport.

The display device according to the present invention also does not describe the distance from the roadway markings (see FR 2 618 244), but instead signalizes whether the assistance/support system has detected roadway markings. Lastly, the display device according to the present invention is a device which is advantageously provided for permanent installation in a means of transport, and which need not be placed in a means of transport solely for temporary use.

From PCT International Publication No. WO 00/14697 a system is known for visually signaling the driving state as well as the change in the driving state, for example when deceleration occurs without the brake pedal being actuated, for other road users. In contrast, an object of the present invention relates to information for the driver of the means of transport itself about the particular operating/system state of a lane keeping support system (assistance/support system) onboard.

DETAILED DESCRIPTION

Figure 1:
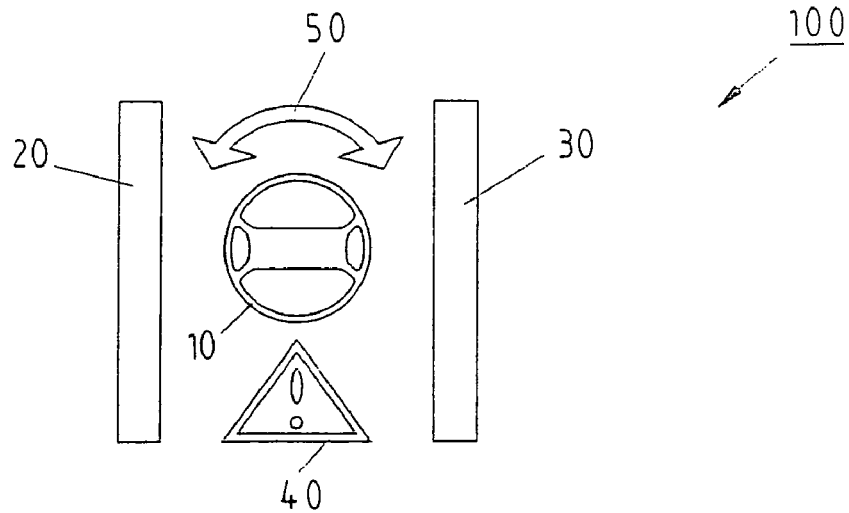
FIG. 1 shows in a schematic block representation a first embodiment of a device according to the present invention.
Figure 2:
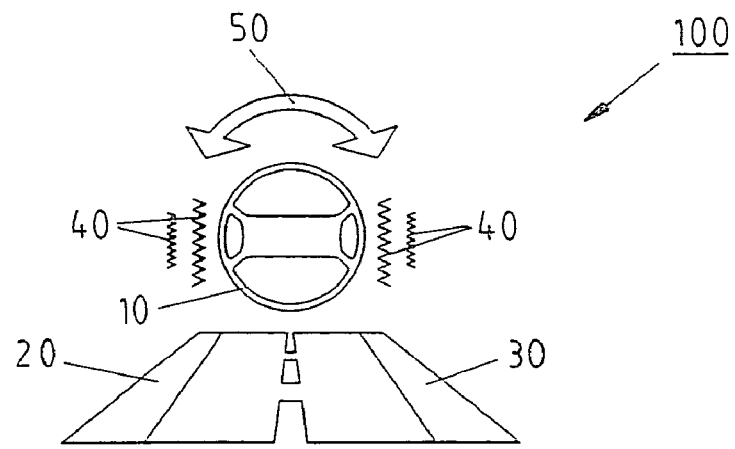
FIG. 2 shows in a schematic block representation a second embodiment of a device according to the present invention.
Figure 3:
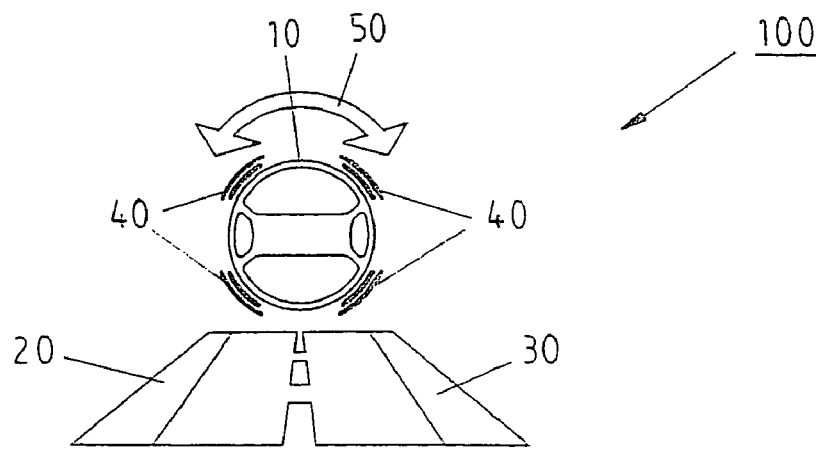
FIG. 3 shows in a schematic block representation a third embodiment of a device according to the present invention.

FIGS. 1 through 3 show three embodiments of a device 100 associated with a motor vehicle (not shown for sake of clarity); this device 100 is used to intuitively detect the operating/system states of a driving assistance/support system for the lateral guidance of the motor vehicle, and in each case has five display elements 10, 20, 30, 40, 50 for displaying the particular operating and/or system states.

A symbol, namely a (stylized) steering wheel, is represented by display element 10 which to a certain extent functions as a "main switch" and which is directly correlated with the steering task, i.e., with the function of the assistance/support system, and which is associated accordingly by the driver of the motor vehicle; this display element 10 is used primarily to signal to the driver of the motor vehicle whether or not the assistance/support system is switched on.

Display elements 20 or 30, in contrast, are directed to the operating/system state for detecting the left marking (->left roadway boundary) or the right marking (->right roadway boundary), respectively. To this end, in the first embodiment according to FIG. 1, display elements 20 or 30 are designed as stylized roadway markings (two essentially vertical lines or bars) left or right, respectively, of display element 10.

If, on the other hand, display elements 20 or 30 for the operating/system state for detecting the left marking (->left roadway boundary) or the right marking (->right roadway boundary) are combined into one display element, as is the case for the second embodiment according to FIG. 2 and the third embodiment according to FIG. 3, the design is an essentially trapezoidal road element in perspective view; this trapezoidal road element is situated under display element 10 in FIGS. 2 and 3.

For display element 40, relating to the activity state of the lane departure warning (LDW), a "warning" symbol such as an exclamation sign is provided to the driver of the motor vehicle for reasons of intuitive understandability in each of FIGS. 1 through 3, it being possible to integrate the exclamation sign into a triangular warning sign in the form of a "warning triangle" (see FIG. 1), or also as a loudspeaker symbol.

As can be seen from FIGS. 2 and 3, it is also possible to symbolically represent vibrations by display element 10 (steering wheel symbol) by acoustic feedback and/or by tactile feedback to the driver of the means of transport, which depends on the particular actual implementation of the lane departure warning.

For the three embodiments according to FIGS. 1 through 3, display element 50 for the activity state of the lane keeping support (LKS) is implemented by a symbol for rotation, namely, by a double arrow just above display element 10; in the manner according to the present invention a symbol for a retaining force is also possible for display element 50, such as in the form of at least one outer arrow next to display elements 20 or 30.

In summary, it may be concluded that an integrated and complete design for designing display elements 10, 20, 30, 40, 50 of a lane keeping support system (driver assistance/support system) is provided by the present invention, exemplified by the three embodiments in FIGS. 1 through 3; in this way the variety of information relevant to the driver of the motor vehicle provided by the driver assistance/support system is displayed in a compact, intuitively understandable manner.

What is claimed is:

1. A device for at least one motor vehicle, the device comprising:
   a detecting device for detecting states of a lane departure warning and a lane keeping support; and
   at least one display instrument for displaying the states of the lane departure warning and the lane keeping support,
   wherein the states are at least one of operating and system states, and wherein the lane departure warning is provided by an actively warning system configured to provide a warning for transverse guidance of the vehicle, and wherein the lane keeping support is provided by an actively controlling system configured to provide an automatic control of the vehicle with respect to transverse guidance of the vehicle.

2. The device according to claim 1, wherein the at least one display instrument is adapted to separately or simultaneously display at least one of the following states:
   the lane departure warning and the lane keeping support in a switched-off state;
   the lane departure warning and the lane keeping support in a passive state;
   the lane departure warning and the lane keeping support in an actively warning state; and
   the lane departure warning and the lane keeping support in at least one of (a) at least one state detecting one left roadway boundary and (b) at least one state detecting one right roadway boundary.

3. The device according to claim 2, wherein the at least one display instrument includes a display element, designed as a double arrow, for displaying the lane keeping support.

4. The device according to claim 2, wherein the at least one display instrument includes a display element, designed as one of an exclamation mark, a vibration sign and a warning triangle, for displaying the lane departure warning.

5. The device according to claim 2, wherein the at least one display instrument includes at least one display element, designed as one of (a) two substantially vertical lines/bars and (b) at least one trapezoid symbolizing a roadway in perspective view, for displaying the at least one of (a) at least one state detecting one left roadway boundary and (b) at least one state detecting one right roadway boundary.

6. The device according to claim 1, wherein the at least one display instrument includes a display element designed as at least one backlit pictogram.

7. The device according to claim 1, wherein the at least one display instrument includes a display element designed as at least one matrix of multicolored, actively lighting subelements.

8. The device according to claim 7, wherein the display element includes one of a color display screen and a LED matrix.

9. The device according to claim 1, wherein the device cooperates with an instrument panel of the motor vehicle.

10. A device for at least one motor vehicle, the device comprising:
- a detecting device for detecting states of a lane departure warning and a lane keeping support; and
- at least one display instrument for displaying a particular at least one of the states of the lane departure warning and the lane keeping support,
- wherein the states are at least one of operating and system states;
- wherein the at least one display instrument includes a display element, designed as a steering wheel, for displaying a function of at least one of the lane departure warning and the lane keeping support.

* * * * *